United States Patent

Yamano et al.

Patent Number: 5,620,508
Date of Patent: Apr. 15, 1997

[54] HEAT MELTABLE SOLID INK

[75] Inventors: Tadamichi Yamano; Takao Arimura, both of Osaka, Japan

[73] Assignee: Fujicopian Co., Ltd., Japan

[21] Appl. No.: 633,294

[22] Filed: Apr. 16, 1996

[30] Foreign Application Priority Data

Apr. 17, 1995 [JP] Japan ................................. 7-090761
Nov. 10, 1995 [JP] Japan ................................. 7-292873

[51] Int. Cl.⁶ ................................................ C09D 11/08
[52] U.S. Cl. ..................... 106/23 A; 106/30 R; 106/30 A
[58] Field of Search .............................. 106/23 A, 30 R, 106/30 A

[56] References Cited

U.S. PATENT DOCUMENTS 4,661,393  4/1987  Uchiyama et al. ................. 106/31 A
5,141,559  8/1992  Shinozuka et al. ................. 106/22 A

FOREIGN PATENT DOCUMENTS 80914  3/1994  Japan.

Primary Examiner—Helene Klemanski
Attorney, Agent, or Firm—Fish & Neave

[57] ABSTRACT

A solvent-free heat meltable solid ink is provided which ensures printed images of good fastness without any deterioration of its coating properties and which comprises a rosin-type resin in an amount of not less than 10% by weight based on the total amount of the ink, and a coloring agent comprising carbon black and an oil-soluble dye. In one embodiment of the present invention, the oil-soluble dye is a metal complex dye.

5 Claims, No Drawings

HEAT MELTABLE SOLID INK

BACKGROUND OF THE INVENTION

The present invention relates to solid inks for use in thermal transfer recording media adapted for thermal transfer printers to be used in computers, facsimile transmission apparatuses, word processors, bar-code printers and the like.

Thermal transfer recording media, in general, comprise a foundation, and an ink comprising a vehicle such as a wax or a resin and a coloring agent which is applied onto the foundation. Inks for use in such thermal transfer recording media are roughly divided into two types: solid inks, and solvent-based inks prepared by dissolving or dispersing ink components in a solvent, by their form upon application onto the foundation. The solvent-based inks offer a high degree of freedom for material selection and provide diversified characteristics. However, the use of a solvent imposes additional costs including the cost of the solvent itself and the cost for drying on the price of the solvent-based inks. Thus, the solvent-based inks are more costly than the solid inks.

The solid inks, on the other hand, are more advantageous than the solvent-based inks in that a solvent is not used therein. However, there has been a limitation imposed on materials usable in the solid inks since the upper limit of melt viscosity of the inks is restricted due to application onto a foundation by hot melt coating and, hence, it has been difficult to obtain solid inks exhibiting diversified characteristics. The restriction of a melt viscosity requires, for example, the use of a wax having a low melt viscosity as a main component for the vehicle. The solid inks each containing a vehicle mainly composed of a wax result in printed images suffering poor fastness compared to those resulting from the solvent-based inks each containing a vehicle mainly composed of a resin.

Intensive study to overcome the foregoing problems essential to the solid inks has been made by the present inventors and led to a solid ink ensuring printed images of rather enhanced fastness which comprises carbon black as a coloring agent, and a vehicle containing a wax as a major component thereof and a rosin-type resin in an amount of not less than 10% by weight based on the total amount of the ink.

This solid ink, however, has encountered a different problem that the carbon black and the vehicle component are separated upon heat melting of the ink, thus degrading the coating properties of the ink.

In view of the foregoing, it is an object of the present invention to provide a heat meltable solid ink providing printed images of enhanced fastness with no degradation of the coating properties thereof.

The foregoing and other objects of the present invention will be apparent from the following detailed description.

SUMMARY OF THE INVENTION

In accordance with the present invention, there is provided a solvent-free heat meltable solid ink comprising a rosin-type resin in an amount of not less than 10% by weight based on the total amount of the ink, and a coloring agent comprising carbon black and an oil-soluble dye.

In accordance with an embodiment of the present invention, the heat meltable solid ink is further characterized in that the oil-soluble dye is a metal complex dye.

In accordance with another embodiment of the present invention, the heat meltable solid ink is further characterized in that the proportions of the carbon black and the oil-soluble dye are 95% to 20% by weight and 5% to 80% by weight, respectively, based on the total amount of the carbon black and the oil-soluble dye.

In accordance with still another embodiment of the present invention, the heat meltable solid ink is further characterized in that the ink further comprises, as a vehicle component, a wax and/or a thermoplastic resin other than the rosin-type resin.

In accordance with further embodiment of the present invention, the heat meltable solid ink is further characterized in that the proportions of the coloring agent, the rosin-type resin, the wax and the thermoplastic resin are 5% to 25% by weight, 10% to 30% by weight, 50% to 80% by weight and 5% to 20% by weight, respectively, based on the total amount of the ink.

DETAILED DESCRIPTION

The present invention will now be described in detail.

The present inventors have made repeated and intensive study to overcome the problems of the heat meltable solid ink containing a rosin-type resin as a vehicle component and reached the findings: by partially replacing carbon black as the coloring agent with an oil-soluble dye, the oil-soluble dye functions like a dispersant in the combination of the carbon black and the rosin-type to ensure favorable dispersion, so that the coloring agent and the vehicle will not be separated; and the use of a metal complex dye, in particular, as the oil-soluble dye causes better dispersion to occur thereby providing a smooth coating surface which in turn prevents an image receptor from being smudged upon printing. Thus, the present invention has been attained.

Specifically, by using a coloring agent comprising carbon black and an oil-soluble dye in a solvent-free heat meltable solid ink containing a rosin-type resin in an amount of not less than 10% by weight based on the total amount of the ink, the coloring agent and the vehicle component will not be separated upon heat melting, whereby the ink exhibits favorable coating properties when subjected to hot melt coating. This provides a uniform ink layer in the manufacture of thermal transfer recording media. In addition, the use of a rosin-type resin in an amount of not less than 10% by weight based on the total amount of the ink ensures printed images of excellent fastness.

Further, if a metal complex dye is used as the oil-soluble dye, better dispersion will occur thereby providing an ink coat with a smooth surface which will prevent an image-receiving paper sheet from being smudged in printing.

In the present invention, the coloring agent comprises black and an oil-soluble dye. The proportion of the oil-soluble dye to be used is preferably within the range of 5% to 80% by weight, more preferably 10% to 50% by weight based on the total amount of the carbon black and the oil-soluble dye. If the proportion of the oil-soluble dye is less than the above range, separation of the coloring agent from the vehicle tends to be insufficiently prevented. If the proportion exceeds the above range, printed images having a poor density or a degraded weather resistance will frequently result.

The proportion of the coloring agent (a mixture of carbon black and the oil-soluble dye) to be used is preferably within the range of 5% to 25% by weight based on the total mount of the ink. If the proportion of the coloring agent is less than the above range, printed images having a poor density will frequently result. If the proportion exceeds the above range, the resulting ink is likely to exhibit an undesirably high melt viscosity, deteriorating the coating properties.

Examples of specific oil-soluble dyes include azine dyes, monoazo dyes, diazo dyes, metal complex type monoazo dyes, anthraquinone dyes, phthalocyanine dyes, and triarylmethane dyes. Of these dyes, black or blue color dyes are preferable. Such preferable dyes include Nigrosine Base, Oil Black and Varifast Black (available from ORIENT KAGAKU KOGYO KABUSHIKI KAISHA), Aizen Spilon Black and Aizen Spilon Blue (available from HODOGAYA CHEMICAL CO., LTD.), Sumiplast Black (available from SUMITOMO CHEMICAL COMPANY LIMITED), Diaresin (available from MITSUBISHI CHEMICAL CORPORATION), and so forth. Of these, Varifast Black and Aizen Spilon Black are metal complex dyes (premetallized dyes). The above exemplified oil-soluble dyes may be used either alone or in combination.

The solid ink according to the present invention contains the foregoing coloring agent and rosin-type resin as essential components. The proportion of the rosin-type resin to be used is not less than 10% by weight based on the total amount of the ink.

Examples of specific rosin-type resins include rosins, hydrogenated rosins, disproportionated rosins, rosin esters, rosin-modified phenolic resins, rosin-modified maleic acid resins, and rosin-modified xylene resins. These may be used either alone or in combination.

In the present invention, the solid ink is incorporated with not less than 10% by weight of the rosin-type resin to enhance the fastness of resulting printed images. If the proportion of the rosin-type resin is too great, the transferability of the ink may be deteriorated, or the melt viscosity of the ink may become too high to avoid a decrease in productivity and a deterioration in the coating properties. From this viewpoint, the proportion of the rosin-type resin is preferably not greater than 30% by weight based on the total amount of the ink.

In the solid ink of the present invention, the vehicle component may comprise, in addition to the rosin-type resin, a wax and/or a thermoplastic resin other than the rosin-type resin. To ensure favorable coating properties in hot melt coating, it is preferable that the ink is incorporated with a wax in an amount of 50% to 80% by weight based on the total amount of the ink.

Further, to impart a resulting ink layer with a flexibility and appropriate film properties, the ink is preferably incorporated with a thermoplastic resin other than the rosin-type resin in an amount of 5% to 20% by weight based on the total amount of the ink.

Examples of specific waxes usable in the solid ink include natural waxes such as paraffin wax, microcrystalline wax, haze wax, bees wax, carnauba wax and candelilla wax; synthetic waxes such as polyethylene wax, Fischer-Tropsch wax and $\alpha$-olefin-maleic anhydride copolymer wax; oxidized waxes or modified waxes of the foregoing natural waxes or synthetic waxes; higher fatty acids such as myristic acid, palmitic acid, stearic acid and behenic acid; and substances having a wax-like property such as higher aliphatic alcohols and higher fatty acid esters. These waxes may be used either alone or in combination.

Examples of specific thermoplastic resins (including elastomers) usable in the solid ink include olefin copolymer resins such as ethylene-vinyl acetate copolymer and ethylene-acrylic ester copolymer, polyamide resins, polyester resins, epoxy resins, polyurethane resins, acrylic resins, vinyl chloride resins, cellulosic resins, vinyl alcohol resins, petroleum resins, phenolic resins, styrene resins, vinyl acetate resins, elastomers such as natural rubber, styrene-butadiene rubber, isoprene rubber and chloroprene rubber, polyisobutylene and polybutene. These thermoplastic resins may be used either alone or in combination.

Preferable formula of the solid ink according to the present invention is shown in Table 1.

TABLE 1

| Ingredient | % by weight |
|---|---|
| Coloring agent* | 5–25 |
| Rosin-type resin | 10–30 |
| Wax | 50–80 |
| Thermoplastic resin | 5–20 |

*Note that the coloring agent contains 95% to 20% by weight, particularly 90% to 50% by weight of carbon black and 5% to 80% by weight, particularly 10% to 50% by weight of an oil-soluble dye.

The solid ink of the present invention may be admixed with typical additives for use in this type of inks such as a dispersant, antistatic agent, antioxidant and ultraviolet absorber.

The solid ink of the present invention can be prepared by uniformly kneading the above ingredients at a temperature higher than the melting point of the vehicle.

The solid ink of the present invention can be used in various types of thermal transfer recording media such as one-time use type wherein a uniform layer of a thermal transfer ink is formed on a foundation, ink-exudation type for multiple-time use wherein a non-transferable porous layer containing a thermal transfer ink is formed on a foundation, and ink-shaving type for multiple-time use wherein a thermal transfer ink layer admixed with a barrier material (particulate material such as carbon black) is formed on a foundation so that the ink layer is gradually shaved in the thicknesswise direction upon every heating for transfer.

Examples of foundations for use in the present invention include polyester films such as polyethylene terephthalate film, polyethylene naphthalate film and polyarylate film, polycarbonate films, polyamide films, aramid films, and other various plastic films commonly used for the foundation of ink ribbons of this type. Thin paper sheets of high density such as condenser paper can also be used. The thickness of the foundation is usually from about 1 to about 10 μm, preferably about 2 to about 7 μm, so as to ensure good heat conduction and maintain a sufficient strength.

On the side of the foundation opposite to the side coated with the thermal transfer ink layer may be formed a conventionally known stick-preventive layer. Materials for forming such a stick-preventive layer include various heat-resistant resins such as silicone resin, fluorine-containing resin and nitrocellulose resin, and other resins modified with these heat-resistant resins, and mixtures of the foregoing heat-resistant resins and lubricating agents.

The present invention will be more fully described by way of examples and comparative examples thereof. It is to be understood that the present invention not limited to these examples, and various changes and modifications may be made in the invention without departing from the spirit and scope thereof.

EXAMPLES 1–6 AND COMPARATIE EXAMPLES 1–4

Solid inks were prepared by melting and kneading ingredients shown in Table 2 with a triple roll mill.

The solid inks thus prepared were each applied in a coating amount of 4.0 g/m$^2$ onto a 6 μm-thick polyethylene terephthalate film with a hot melt coater to form a thermal transfer recording medium.

Each ink and each thermal transfer recording medium were evaluated for the following items. The results are shown in Table 2.

In evaluating the transferability, scratch proofness and density of printed images, each thermal transfer recording medium was used in a bar-code printer (B-30, available from TEC Corporation) to print a bar-code image on a high-quality paper sheet (Bekk smoothness: 140 seconds) at a printing energy of 20 mJ/mm$^2$.

Transferability

Bar-code images thus obtained were observed for evaluation according to the following criterion.

o: any void not observed with good sharpness;

X: many voids observed with significantly degraded sharpness.

Scratch proofness

Using a crock meter (available from ATLAS ELECTRIC DEVICE COMPANY in U.S.A.), a piece of cloth was moved back and forth 30 times on the bar-code images under a pressure of 500 g/cm$^2$, followed by evaluation of the resulting smudge of the image-printed surface due to the ink scrubbed by observation according to the following criterion.

o: any smudge not observed on the image-printed surface;

X: smudge observed on the image-printed surface.

Image density

The reflection optical density (OD value) of the bar-code images was measured using a reflection densitometer (Macbeth RD-914).

Smudge preventability

Each image-receptor paper sheet subjected to printing under the above conditions was observed for smudge of the paper sheet due to rubbing with each thermal transfer recording medium for evaluation according to the following criterion.

Excellent: no smudge observed;

Good: little smudge observed;

Bad: conspicuous smudge observed.

Separation of ink

Each ink in a test tube was allowed to stand in a temperature-controlled bath at 140° C. for 94 hours, and then observed and evaluated for its separation state according to the following criterion.

o: No separation of ink observed;

X: Separation of ink observed.

Note that solid inks with occurrence of separation were not used to manufacture thermal transfer recording media and hence not evaluated for transferability, scratch proofnes, image density and smudge preventability. This is reflected by character "—" in the rows of evaluation in Table 2.

TABLE 2

|  | Ex. 1 | Ex. 2 | Ex. 3 | Ex. 4 | Ex. 5 | Ex. 6 | Com. Ex. 1 | Com. Ex. 2 | Com. Ex. 3 | Com. Ex. 4 |
| --- | --- | --- | --- | --- | --- | --- | --- | --- | --- | --- |
| Formula of ink (% by weight) | | | | | | | | | | |
| HNP5*[1] | 50.0 | 40.0 | 40.0 | 50.0 | 40.0 | 40.0 | 50.0 | 50.0 | 50.0 | 40.0 |
| Carnauba No. 3*[2] | 20.0 | 10.0 | 20.0 | 20.0 | 20.0 | 30.0 | 30.0 | 30.0 | 20.0 | 10.0 |
| Super Ester A-100*[3] | 10.0 | 30.0 | — | — | 10.0 | 10.0 | — | — | — | 30.0 |
| Tamanol 135*[4] | — | — | 20.0 | 10.0 | 10.0 | — | — | — | 10.0 | — |
| EVA*[5] | 10.0 | 10.0 | 10.0 | 10.0 | 10.0 | 10.0 | 10.0 | 10.0 | 10.0 | 10.0 |
| Carbon black | 9.0 | 9.0 | 9.0 | 5.0 | 5.0 | 8.0 | 9.0 | 10.0 | 10.0 | 10.0 |
| Nigrosine Base EX*[6] | 1.0 | — | 1.0 | — | 5.0 | — | 1.0 | — | — | — |
| Oil Black 860*[7] | — | 1.0 | — | 5.0 | — | — | — | — | — | — |
| Aizen Spilon Black BH*[8] | — | — | — | — | — | 2.0 | — | — | — | — |
| Evaluation | | | | | | | | | | |
| Transferability | o | o | o | o | o | o | o | o | — | — |
| Scratch proofness | o | o | o | o | o | o | x | x | — | — |
| Image density (OD value) | 1.8 | 1.9 | 1.8 | 1.6 | 1.6 | 1.7 | 1.8 | 1.8 | — | — |
| Smudge preventability | Good | Good | Good | Good | Good | Excellent | Good | Good | — | — |
| Separation of ink | o | o | o | o | o | o | o | o | x | x |

*[1]: Paraffin wax available from NIPPON SEIRO CO., LTD.
*[2]: Carnauba wax available from Toyo Ink Manufacturing Co., Ltd.
*[3]: Rosin ester available from ARAKAWA KAGAKU KOGYO KABUSHIKI KAISHA
*[4]: Rosin-modified phenolic resin available from RIKA HERCULES CO., LTD.
*[5]: Ethylene-vinyl acetate copolymer resin (ethylene/vinyl acetate = 72:28 in weight ratio, melt flow rate: 15)
*[6]: Oil-soluble dye available from ORIENT KAGAKU KOGYO KABUSHIKI KAISHA
*[7]: Oil-soluble dye available from ORIENT KAGAKU KOGYO KABUSHIKI KAISHA
*[8]: Oil-soluble dye (metal complex dye) available from HODOGAYA CHEMICAL CO., LTD.

In addition to the materials and ingredients used in the Examples, other materials and ingredients can be used in Examples as set forth in the specification to obtain substantially the same results.

What is claimed is:

1. A solvent-free heat meltable solid ink comprising a rosin resin in an mount of not less than 10% by weight based on the total amount of the ink, and a coloring agent comprising carbon black and an oil-soluble dye.

2. The heat meltable solid ink of claim 1, wherein the oil-soluble dye is a metal complex dye.

3. The heat meltable solid ink of claim 1, wherein the proportions of the carbon black and the oil-soluble dye are 95% to 20% by weight and 5% to 80% by weight, respectively, based on the total amount of the carbon black and the oil-soluble dye.

4. The heat meltable solid ink of claim 1, further comprising, as a vehicle component, a wax and a thermoplastic resin other than the rosin resin.

5. The heat meltable solid ink of claim 4, wherein the proportions of the coloring agent, the rosin resin, the wax and the thermoplastic resin are 5% to 25% by weight, 10% to 30% by weight, 50% to 80% by weight and 5% to 20% by weight, respectively, based on the total amount of the ink.

* * * * *

UNITED STATES PATENT AND TRADEMARK OFFICE
CERTIFICATE OF CORRECTION

PATENT NO : 5,620,508
DATED : April 15, 1997
INVENTION(S) : HEAT MELTABLE SOLID INK It is certified that error appears in the above-identified patent and that said Letters Patent is hereby corrected as shown below:

```
Cover Page, Item [56], delete "80914" and substitute therefor
-- 6-80914 --.

Column 2, line 59 delete "mount" and substitute therefor
-- amount --.

Column 3, line 7 after "COMPANY" insert a comma -- , -.

Column 4, line 15 delete "inks" and substitute therefor
-- ink --.

Column 5, line 57 delete "mount" and substitute therefor
-- amount --.
```

Signed and Sealed this

Twenty-sixth Day of December, 2000

*Attest:*

Q. TODD DICKINSON

*Attesting Officer*     *Director of Patents and Trademarks*